United States Patent [19]

Sperner

[11] Patent Number: 5,340,638
[45] Date of Patent: Aug. 23, 1994

[54] BULK MATERIAL FOR PACKAGING, PACKAGING UNIT USING SAME, PROCESS AND APPARATUS FOR PRODUCING THEM

[76] Inventor: Franz Sperner, Drosselweg 12, D-7449 Neckartenzlingen, Fed. Rep. of Germany

[21] Appl. No.: 761,772
[22] PCT Filed: Jan. 2, 1990
[86] PCT No.: PCT/EP90/00181
  § 371 Date: Oct. 2, 1991
  § 102(e) Date: Oct. 2, 1991
[87] PCT Pub. No.: WO90/08709
  PCT Pub. Date: Aug. 9, 1990

[30] Foreign Application Priority Data

Feb. 4, 1989 [DE] Fed. Rep. of Germany ....... 3903382

[51] Int. Cl.$^5$ .......................... B32B 3/28; B31B 1/14
[52] U.S. Cl. ......................................... 428/182; 428/2;
  428/174; 428/184; 428/220; 428/332; 493/342;
  493/352; 493/354; 493/464; 493/967; 206/814;
  264/167; 264/286; 264/505
[58] Field of Search ................... 428/182, 184, 174, 2,
  428/192, 220, 332; 493/967, 352; 206/354, 464,
  584; 264/505, 167, 286, 294; 267/141, 141.7

[56] References Cited

U.S. PATENT DOCUMENTS

| | | | |
|---|---|---|---|
| 1,995,057 | 3/1935 | Ellis | 154/33 |
| 3,074,543 | 1/1963 | Stanley | 206/46 |
| 4,557,716 | 12/1985 | Ottaviano | 493/464 |

FOREIGN PATENT DOCUMENTS

| | | |
|---|---|---|
| 3718541A1 | 12/1988 | Fed. Rep. of Germany . |
| 3903382C2 | 4/1992 | Fed. Rep. of Germany . |
| WO85/03029 | 7/1985 | PCT Int'l Appl. . |
| 1300816 | 12/1972 | United Kingdom . |

*Primary Examiner*—Donald J. Loney
*Attorney, Agent, or Firm*—Jones, Tullar & Cooper

[57] ABSTRACT

Chips of cardboard, in particular of packing cardboard, which are formed by cutting flat, preferably used packing cardboard lengthwise and crosswise, and the bulk volume of which is increased by copings and/or bent-over portions and/or peaks and/or recesses are provided, as is a packing unit comprising a wrapper, loosely filled at least to a substantial proportion with the bulk packing material made from a web of paper, in which the wrapper is formed by the web of paper shaped in the manner of a helical roll, the adjacent, helically extending long edges of which web are joined overlapping one another, and in which the wrapper is closed at both ends in the manner of a sack, and as is a process in which the cardboard, in particular packaging cardboard, is comminuted (cut) and is deformed to increase the bulk volume of the chips forming the packaging material, as well as an apparatus having a device for comminuting cardboard, in particular packaging cardboard, having one lengthwise and one crosswise cutting unit, and by a device for deforming the cardboard for the increasing of the bulk volume of the chips forming the packaging materials.

10 Claims, 5 Drawing Sheets

BULK MATERIAL FOR PACKAGING, PACKAGING UNIT USING SAME, PROCESS AND APPARATUS FOR PRODUCING THEM

BACKGROUND OF THE INVENTION

The present invention relates to a bulk packaging material, a packaging unit made from it, and a process and apparatus for producing them.

In packaging breakable articles such as glass, ceramic or the like, or precision mechanical instruments and machines, it is known to fill the space between the applicable article and the shipping container or box with volume-filling packaging material. Expanded shaped parts such as plastic chips are used, for example, as the bulk packaging material. Plastic filler material of this kind must be manufactured separately, which is expensive, and it must be destroyed again in some way, which for certain types of plastic causes considerable environmental pollution. It is also known to use wood shavings as the packaging material, but such material is not easy to handle, because it is not a pourable material. Furthermore, even wood shavings must be made separately from a raw material that would be used in some other way. A packaging material made of helical linear strips of paper, made by wadding up a packaging paper drawn endlessly from a roll of paper, and cutting it up, is also known from British Patent 1,300,816. Once again, such packaging material is not ecologically sound, because it is made from new packaging paper. Furthermore, these helical paper strips form a fairly interconnected mass, because like wood shavings, the strips tend to catch on one another, so that once again, this packaging material is not pourable.

A packaging unit is also known from German Utility Model 87 16 083, which comprises a wrapper or paper and chopped straw or the like poured loosely into it. In this packaging unit, the wrapper is embodied either as a cohesive, matlike pad made of two sheets of paper placed upon one another and stitched in a checkerboard pattern, or in the form of a single pad made from a double strip of paper whose loose paired edges are joined together. Pads of this kind are complicated and expensive to manufacture and to fill. Moreover, if it is to hold chopped straw, the paper for the wrapper must be especially sturdy and must be provided with an especially sturdily bonded edge to prevent the chopped straw from piercing the paper. If the chopped straw did pierce the paper, it could escape through the tiniest opening, which can cause problems, particularly in the case of machines provided with air openings, packaging parts shipped in grease, and the like, if the chopped straw gets into the bearings of such machines. In other words, a packaging unit broken down in this way into its individual parts not only involves work for the receiver of a shipment containing this packaging unit but may also cause damage.

SUMMARY OF THE INVENTION

An object of the invention is to provide a bulk packaging material and a packaging unit provided with it that can be manufactured at favorable cost and that in an ecologically sound manner makes use of existing material previously intended directly for destruction or for recycling. Furthermore, a process and an apparatus for producing such bulk packaging materials and packaging units are disclosed.

To attain this object, chips of cardboard, in particular of packing cardboard, which are formed by cutting flat, preferably used packing cardboard lengthwise and crosswise, and the bulk volume of which is increased by copings and/or bent-over portions and/or peaks and/or recesses are provided, as is a packing unit comprising a wrapper, loosely filled at least to a substantial proportion with the bulk packing material made from a web of paper, in which the wrapper is formed by the web of paper shaped in the manner of a helical roll, the adjacent, helically extending long edges of which web are joined overlapping one another, and in which the wrapper is closed at both ends in the manner of a sack, and as is a process in which the cardboard, in particular packaging cardboard, is comminuted (cut) and is deformed to increase the bulk volume of the chips forming the packaging material, as well as an apparatus having a device for comminuting cardboard, in particular packaging cardboard, having one lengthwise and one crosswise cutting unit, and by a device for deforming the cardboard for the increasing of the bulk volume of the chips forming the packaging materials.

A bulk packaging material is thus achieved that is advantageously made from a material that has already been used in some way, for instance to make cartons or package containers, and which before being finally destroyed is thus re-used before being incinerated and recycled. This economical intermediate use of an already-used material is no impediment to later recycling, and so the bulk packaging material can be produced economically, because essentially the only capital investment is for the machines to make it.

This bulk packaging material according to the invention is also ecologically sound, because i t does not consume any raw materials per se.

Increasing the bulk volume of the chips can be done in many ways, for instance by coping a number of areas along the surface of the piece of cardboard, or simply by bending over edge regions of the pieces of cardboard. A preferred exemplary embodiment, however, is provided in that the increase in bulk volume is on the order of 20%, and the packaging chips have a size on the order of approximately 40×50 ram, which lead to an optimal increase in bulk volume that is uniformly distributed over substantially the entire lengthwise and crosswise extent of the chip, so that regardless of their incidental position inside a packaging container, the bulk packaging material chips &11 have the same type of shock, impact, and vibration absorption.

The same is true for the packaging unit according to the present invention, in which it moreover does no harm if a small hole or tear occurs in the wrapper during the packaging process, because the cardboard chips poured into the container tend to cover the small tear or hole from the inside rather than being capable of escaping from the wrapper through it. The packaging unit wrapper may be filled solely with the cardboard chips. However, it is also possible to add to the cardboard chips a lesser proportion of paper strips, of the kind obtained for instance from a shredder used to destroy documents.

The process and apparatus according to the present invention for producing such bulk packaging material in the form of cardboard chips deformed to increase the bulk volume are clearly simple and economical to carry out and produce, respectively, because they involve merely the cutting of a starting material, that is, of the cardboard or packaging cardboard, and correspondingly deforming the starting material or the pieces of cardboard made from it to make the chips.

The process and the apparatus according to the present invention for producing such packaging units are fast and easy, because the paper strips call easily be wound around the hollow winding core to make a wound tubular roll, which can be filled with the cardboard chips in batches during production without having to interrupt the winding process. It is also possible, during the winding process, to make a sack-type closure and in a preferred manner to sever the wound roll between two adjacent sack-like closures, without interrupting the wound tubular roll. It is also readily possible to make the hollow winding core variable in diameter and/or to make the devices for closing and cutting off the wound tubular roll adjustable in height, so that packaging units of different diameters and lengths can be made in one and the same process with one and the same apparatus.

Further details of the present invention can be found in time ensuing description, in which the invention is described and explained in further detail in terms of the exemplary embodiment shown in the drawing.

BRIEF DESCRIPTION OF THE DRAWINGS

Shown are.

DETAILED DESCRIPTION OF THE PREFERRED EMBODIMENT

Figure 1A:
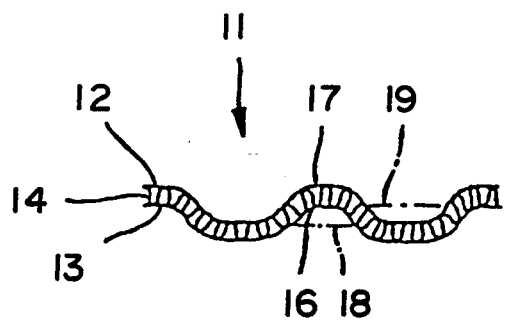
FIGS. 1A–1D, a bulk packaging material in the form of a cardboard chip, in accordance with a preferred exemplary embodiment of the present invention, seen in section, in a side view, in a plan view, and in a perspective view, respectively.
Figure 1C:
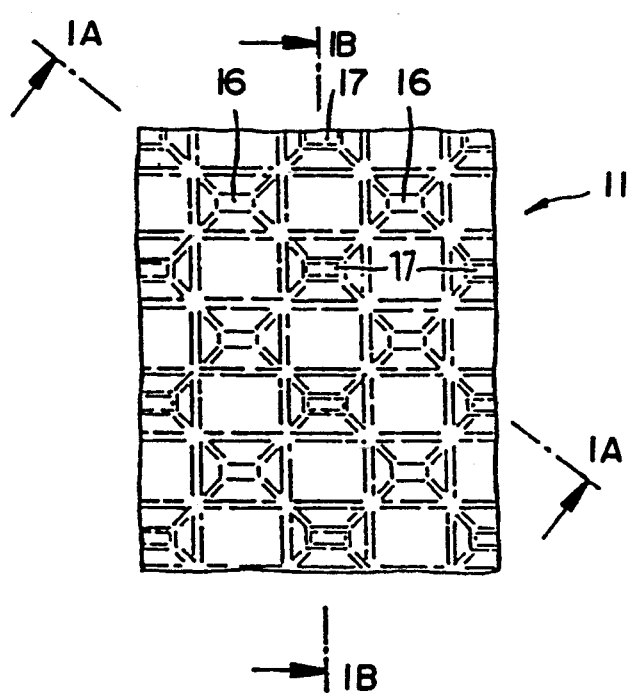
Figure 1B:
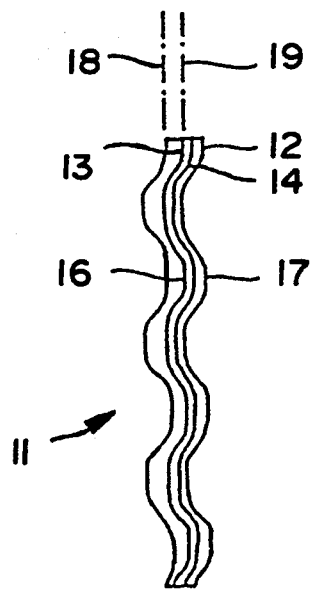
Figure 1D:
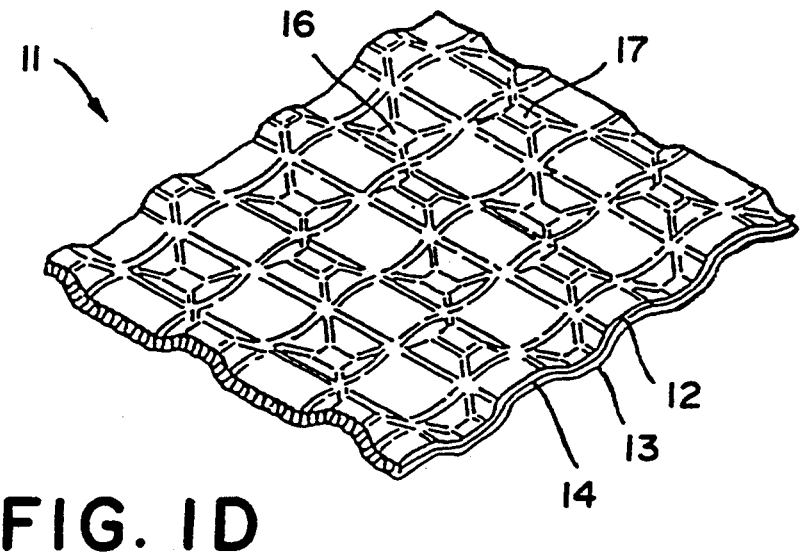

FIGS. 1A–1D, in various sections and views, show bulk packaging material in accordance with a preferred exemplary embodiment of the present invention, in the form of cardboard chips made from a packaging cardboard and having a size on the order of approximately 40 by 50 mm, for example. Such chips 11, one of which is shown in FIG. 1, are made from a single-layer cardboard conventionally used for cartons or packaging, which is made from two outer webs of paper or cardboard 12, 13, with a ply of corrugated cardboard 14 between them. It is understood that other types of packaging cardboard, and in particular thicker ones, such as double-layer or multilayer packaging cardboard, or simple cardboard can be used. Preferably, the packaging chips 11 are made from used or discarded cardboard boxes.

The chip 11 shown in FIGS. 1A–1D, which is used along with many others as bulk packaging material, has recesses or indentations 16 and peaks 17, disposed in an approximately uniform matrix in order to increase the bulk volume by approximately 20% over a flat piece of packaging cardboard of the same dimensions; the indentations and peaks are disposed such that each indentation 16 in one surface 18 of the chip 11 is matched by a corresponding peak 17 on the other surface 19 of the chip 11. A number of such pairs 16, 17 of recesses and peaks is disposed in parallel rows, with the orientation of these recesses and peaks reversed in adjacent rows. In other words, while the peaks protrude from the surface 19 in one row, they rise from the surface 18 in the other row. In a direction transverse to these rows, each of them provided in the same way with the recesses 16 and peaks 17, one recess in the same surface 18 or 19 is followed by one peak, then another recess and another peak, and so forth. It will be understood that the recesses 16 and peaks 17 may also be staggered in this crosswise direction.

It will also be understood that the chips 11 may be not only rectangular, as shown, but of any other arbitrary geometric shape. For simpler manufacture it is suitable to allow variations within certain limits in terms of the shape and dimensions of the chips 11.

Referring to an apparatus 30 for producing such bulk packaging chips 11, shown in FIGS. 2, 3 and 4, 5, a preferred process for producing it will be described at the same time.

Figure 3:
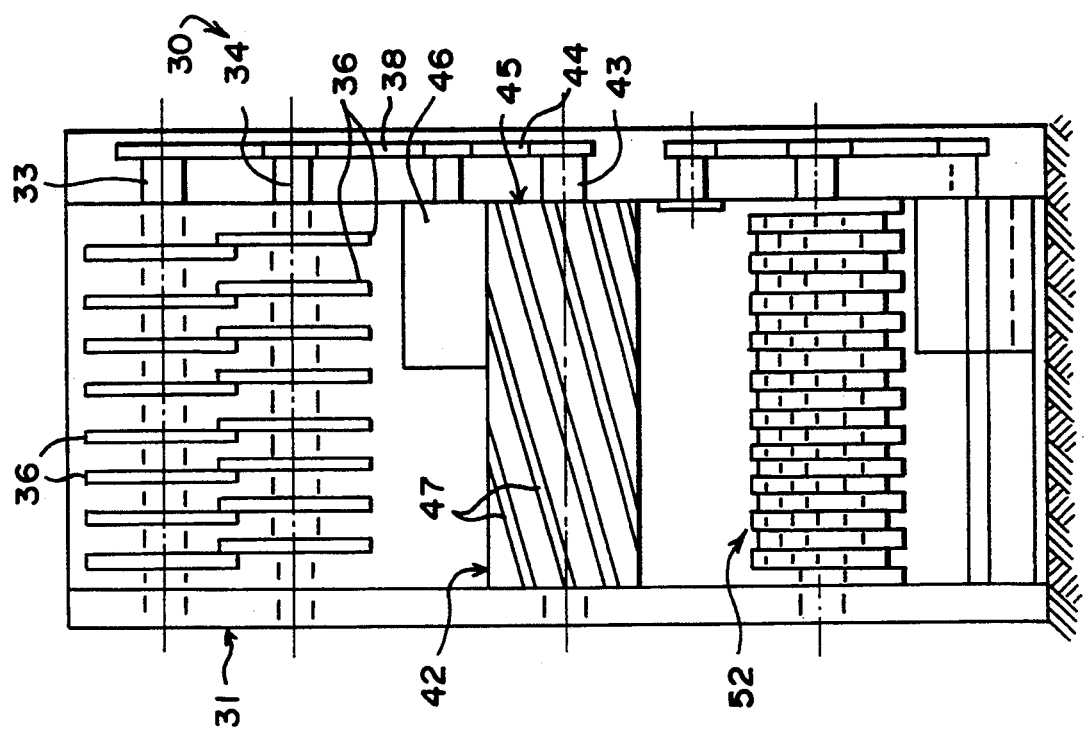
FIG. 3, a schematic view of the apparatus in the direction of the arrow III of FIG. 2.
Figure 2:
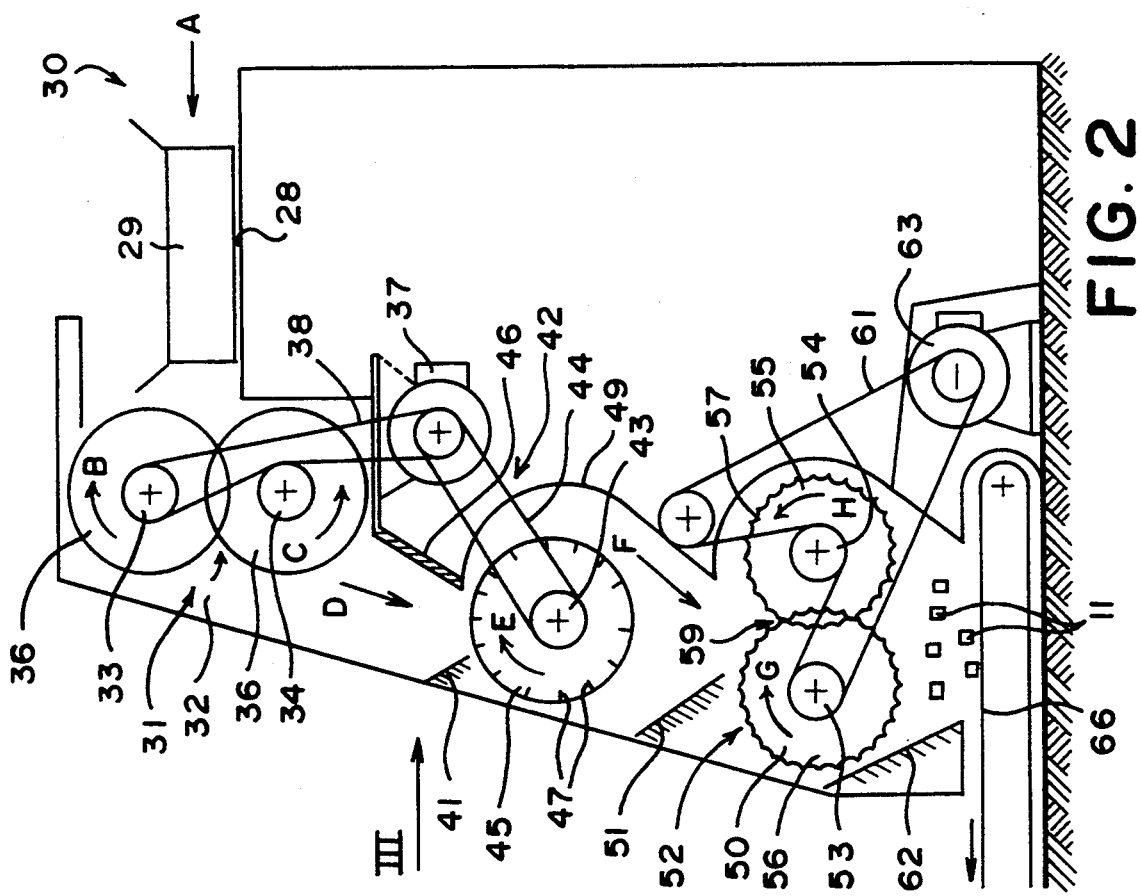
FIG. 2, a schematic view of an apparatus for producing such bulk packaging material from cardboard, in accordance with an exemplary embodiment of the present invention.
Figure 5:
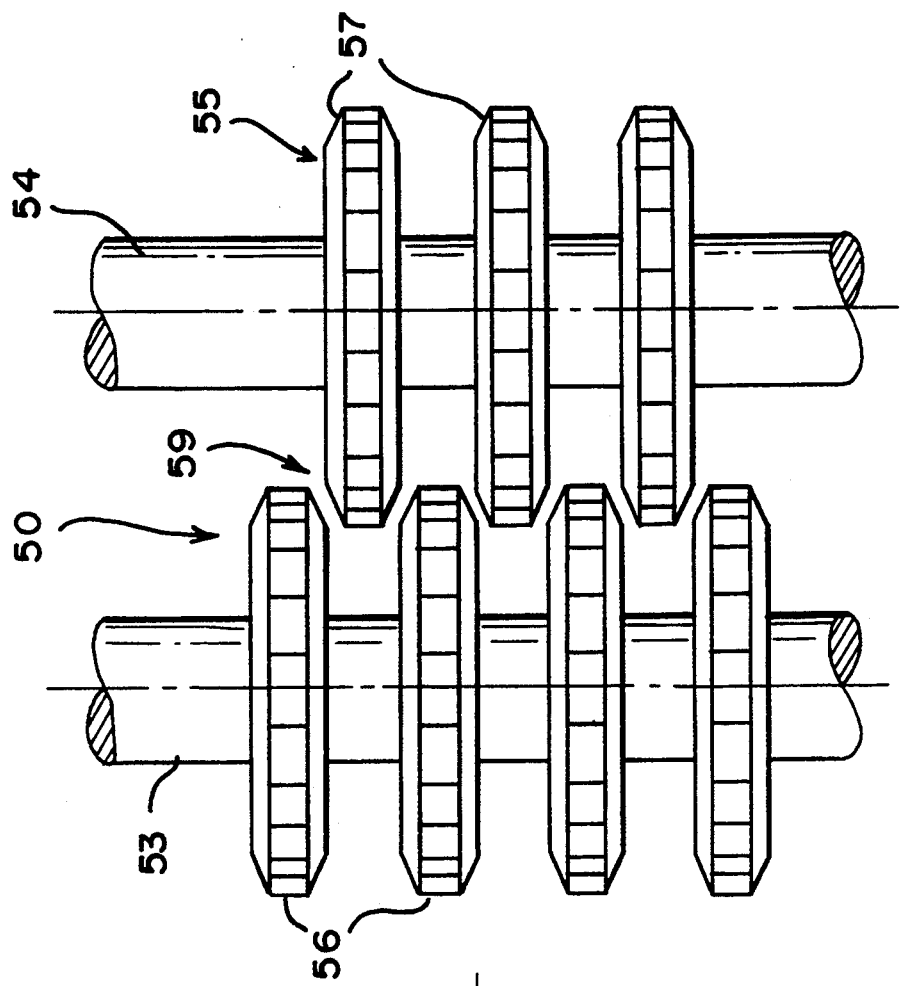
FIG. 5, a view in the direction of the arrow V of FIG. 4.

In FIGS. 2 and 3, the apparatus 30 has a lengthwise cutting unit 31, to which cardboard boxes 29, either folded flat or in assembled form, are delivered in the direction of the arrow A on a tabletop 28 or conveyor belt. The lengthwise cutting unit 31, in which the cardboard boxes 29 are cut into lengthwise strips, has a cutting mechanism 32 in a known manner, comprising disk blades 36, spaced apart from one another on two shafts 33, 34, which in this case are located one above the other; these blades mesh with one another and rest against one another in the cutting regions. The shafts 33 and 34 rotate counter to one another as indicated by the arrows B and C in such a way that they can draw the cardboard box 29, which is to be cut, in between them. The two shafts 33, 34 are driven by a motor 37, for instance by means of a belt 38. The lengthwise strips, the width of one of which corresponds to the size of the finished packaging chip 11, drop in the direction of the arrow D on the outlet side of the lengthwise cutting unit 31, via a funnel 41 located beneath it, into a crosswise cutting unit 42, which has a cutting cylinder 45 and a fixed blade 46. A shaft 43 of the cutting cylinder 45 is driven by the same motor 37, for instance by means of a belt 44, in the direction of the arrow E toward the fixed blade 46, which is inclined relative to the direction of rotation. A number of approximately helical blade strips 47 disposed parallel to the shaft are disposed around the shaft 43, and the cardboard strips can be cut into a plurality of pieces between these strips and the fixed blade 46. A guide baffle 49 is disposed downstream of this cutting region of the crosswise cutting unit 42 and guides the pieces of cardboard in the direction of the arrow F to a second funnel 51, disposed beneath the cutting cylinder 45 and discharging or terminating above a deforming device 52.

Figure 4:
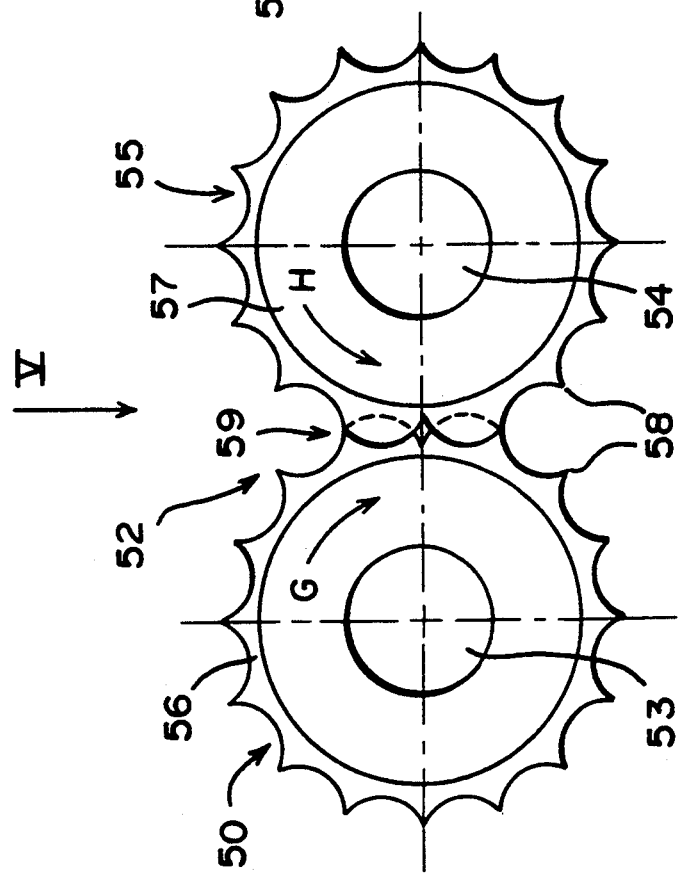
FIG. 4, are enlarged end view of a device for deforming cardboard pieces of the apparatus of FIG. 2.

The deforming device 52 serves to provide the flat cardboard pieces with the bulk volume enlargement as a result of the recesses 16 and peaks 17, in order to produce the final bulk packaging chips 11. To this end, as can also be seen from FIGS. 5 and 6, the deforming device 52 has two deforming units 50, 55, driven in opposite directions as indicated by the arrows G and H, on the shafts 53 and 54 of which a plurality of equidistant deforming wheels 56, 57 are disposed in a manner fixed against relative rotation. The deforming wheels 66 on shaft 53 reach between the deforming wheels 57 on the other shaft 54. The deforming wheels 56, 57 are embodied in the manner of chain wheels; as FIG. 4 shows, the various points 58 of the deforming wheels 56, 57 engaging the gaps between one another are each located opposite one another in the deforming region 59. It will be understood that the various tips 58 may also be staggered by a certain angle relative to one another, which would result in a staggered arrangement of recesses 16 and peaks 17.

The two shafts 93 and 54 are driven via a belt 61, for instance, by an electric motor 63. The individual pieces of cardboard that drop from the second funnel 51 between the two shafts 53, 54 having the deforming wheels 56, 57 are engaged by these wheels and deformed between the tips 58 of the deforming wheels 56, 57 in the manner described for FIG. 1, to make the packaging chips 11. On the outlet side, or in other words below the deforming device 52, there is a conveyor bent 66, which carries the packaging chips 11 to a further conveyor apparatus, for instance, which carries the packaging chips 11 to individual packaging stations, for instance via lines operated with compressed air.

The funnels 41, 51, including a third funnel 62 at the outlet of the deforming device 52, are embodied in the form of grids and on their circumference communicate with a suction unit 67 in a manner not shown in further detail, so that during the process of producing the packaging chips 11, cardboard dust and small shreds of cardboard that are unusable can be removed by suction from the cardboard boxes 29.

Figure 6:
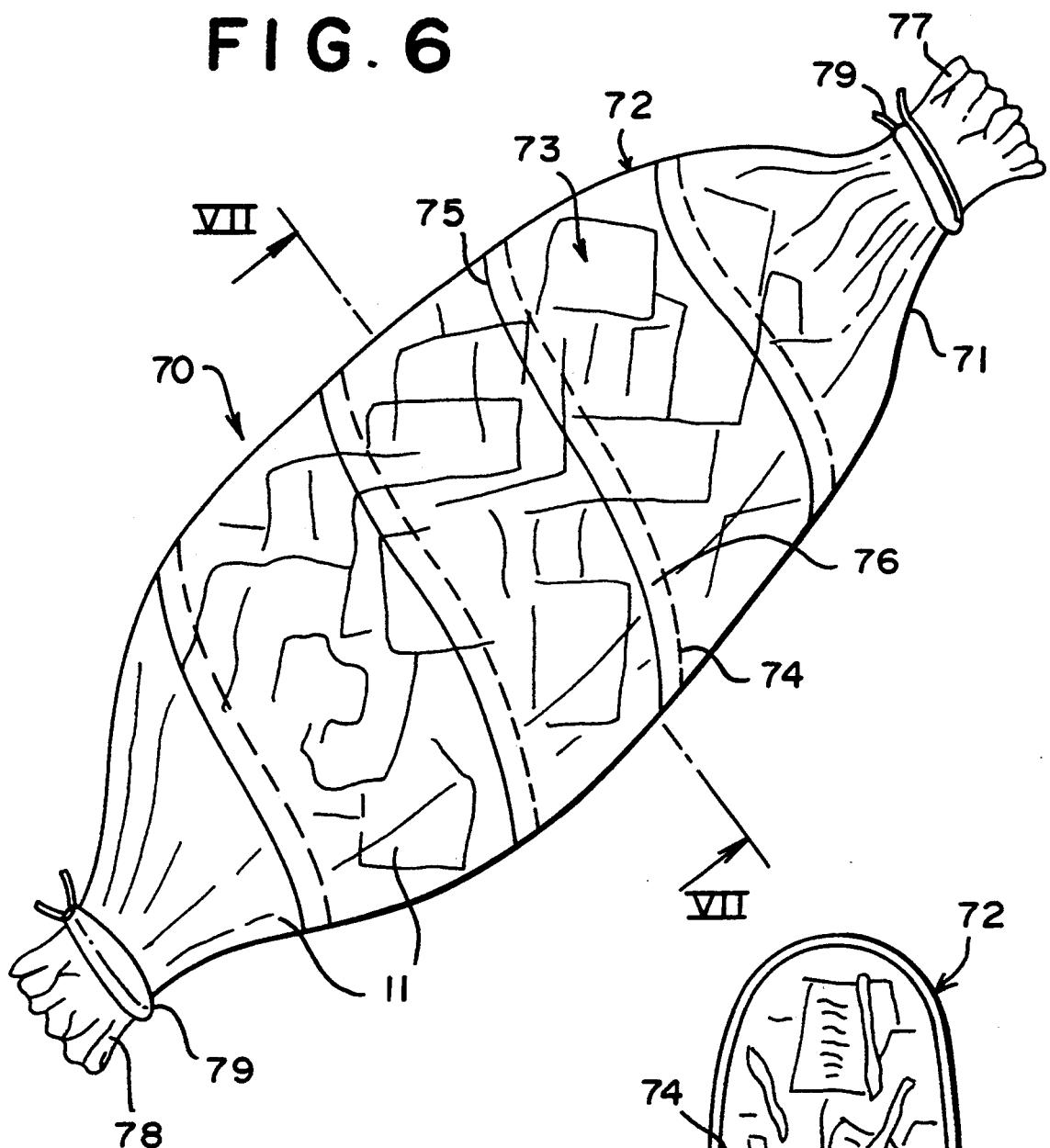
FIG. 6, a schematic, perspective view of a packaging unit, comprising a plurality of packing chips of FIG. 1 and a wrapper.
Figure 7:
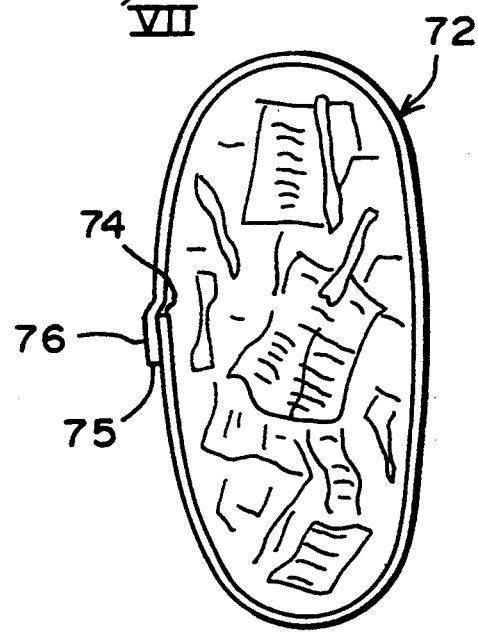
FIG. 7, a section taken along the lines VII—VII of FIG. 6.

In FIGS. 6 and 7, a number of packaging chips 11 has been combined into a packaging unit 70 in such a way that the number of chips 11 is loosely introduced into a wrapper 71 closed on both ends. The wrapper 71 takes the form of a wound tubular roll 72, which is formed by a helical or spiral web 73 of paper, preferably made of recycled paper; the adjacent longitudinal or long edges 74, 75 of the paper web 73 overlap one another and are firmly joined to one another in the overlapping region 76. For instance, the upper and lower long edges 74 and 75 of the paper web 73 are joined together in the overlapping region 76 by an applied layer of adhesive, or by knurling, or in any other way. The wound tubular roll 72 is provided on both ends with a closure 77, 78 of the type typical for sacks or sausages; it is held together by means of a tape 79, for instance. The degree to which the wrapper 71 is filled with the packaging chips 11 is such that the packaging unit 70 can adapt in its dimensions to conditions present inside the wrapper, by sliding of the packaging chips. In one variant, it is also possible to add paper strips, of the kind produced when documents are shredded, in a substantially lesser proportion to the cardboard chips in the wrapper 71. FIG. 7 shows that because of its loose packing density, the roll 72 changes into a roll or tube of oval cross section when it is placed horizontally.

Figures 8, 9:
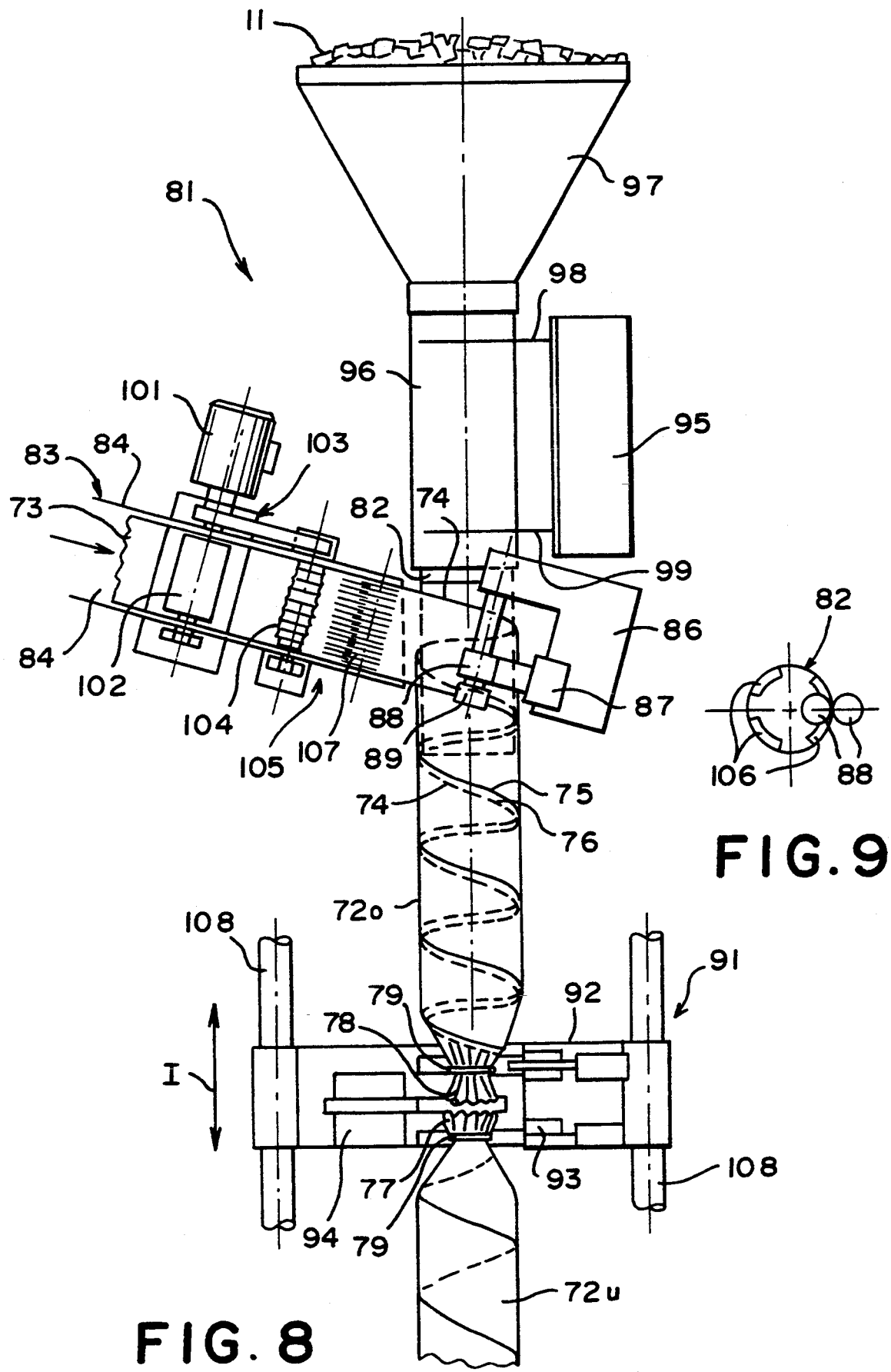
FIG. 8, a schematic view of an apparatus for producing packaging units of FIG. 6.
FIG. 9, a view of the winding core of FIG. 8 from below.

FIG. 8 shows an apparatus 81 for producing wound tubular rolls 72, filling the wound tubular rolls 72 with cardboard chips 11 enclosing the roll 72, or in other words an apparatus for producing complete packaging units 70. The apparatus 81 is provided with a vertically disposed hollow winding core 82, which is retained fixedly and non-rotatably. A delivery device 83 for the web of paper 73 to be drawn from a roll is disposed (from obliquely upward) at an angle of greater than 90° to the axis of the winding core 82. The delivery device 83 has two parallel rails 84, optionally adjustable in terms of their spacing, on which the paper web 73 rests. The paper web 73, delivered obliquely to the outer circumference of the winding core 82, is drawn from the delivery device 83 by a drive device 86 and is fed along the winding core 82. To this end, the drive device 86 has transport rollers 88, driven by a motor 87, the axis of the rollers extending vertically to the longitudinal axis of the paper web 73. At the beginning of a winding operation, the applicable end of the paper web 73, after being pulled through between the transport rollers 88 and the facing surface of the winding core 82, is first wrapped manually around and behind the winding core 82, whereupon after one winding, while still located in front of the drive device 86, the upper long edge 74 of the paper web 73 wraps behind the lower long edge 75 of the paper web 73, or in other words overlaps it in the region 76. It is also possible to provide at least some guide baffles for the beginning of winding around the winding core 82. In the exemplary embodiment, a further roller 89, which serves to produce a glued or knurled edge, is provided on the same shaft of the front draw-off or transport rollers 88. For instance, the two long edges 74 and 75, of which the upper long edge 74 or 75 has a strip of adhesive, are pressed against one another by this roller 89 in the overlapping region 76. Because of this connection of the long edges 74 and 75 of the paper web 73 in the overlapping region 76 that is already made at the beginning of the production of the wound tubular roll 72, the wound tubular roll 72 is then made automatically, such that with the further unfeeling and winding of the paper web 73 around the winding core 82, it moves over this core downward and out.

A combined closing and cutting device 91 is disposed at a distance below the winding core 82, having two closure units 92 and 93, disposed spaced apart from axed vertically one below the other, and a cutting or severing unit 94 disposed between them. In this combined closure and cutting device 91, the wound tubular roll 72 is provided with the sack-like closure 77 and 78 at two points, by being gathered up and wrapped around with a tape 79. At the same time, the wound tubular roll 72 is severed or cut through between the two sack-like closures 77 and 78, with the aid of the cutting unit 94.

A metering conduit 96 is disposed at the upper end of the hollow winding core 82; it cooperates with a metering unit 95, and a fill hopper 97 is mounted on its upper end and can be supplied with the cardboard chips 11, for instance from the conveyor belt 76 shown in FIG. 2. The metering unit 95 has an upper and a lower metering flap 98 and 99, the spacing between which is adjustable for different quantities, and between which the quantity of cardboard chips 11 to be placed in a wound tubular roll 72 is determined and metered.

Along the course of the delivery device 83 for the paper webs 73, there is a printing station 103, provided with a drive motor 101 and a printing cylinder 102.

Adjacent to this printing station, parallel embossing rollers 104 of all embossing station 105 are provided, driven by the motor 101 of the printing station 103. Thus the paper web 73 can be provided, first, with printed advertising material, for instance, and second, with impressed peaks 107 on its surface, for instance, so that it has more grip and is more slip-free inside a package.

In the state shown in FIG. 8, a lower wound tubular roll 72u has just been provided with a closure 77 on its upper end and has been severed from an upper wound tubular roll 72o that while being provided with a lower closure 18 is still open at its upper end. In this position, the wound tubular roll 72o is filled with cardboard chips 11 by the metering unit 95, as a result of the opening of the lower metering flap 99. During this time, the wound tubular roll 72 can be completed and moved farther downward. During that time, by opening of the upper metering flap 98, a further batch of cardboard chips 11 is placed in the metering unit 95. If the region of the upper wound tubular roll 72o that is disposed above the fill level is moved into the region of the combined closure and cutting device 91, then this upper wound tubular roll 72o is provided with an upper closure 77, and at the same time the following wound tubular roll 72 is provided, at a distance therefrom, with a lower closure 78. Once this wound tubular roll 72o is severed from the next one, the above-described process is repeated.

Since the two long edges 74 and 75 are joined together at the very beginning of winding of the paper weld 73 onto the winding core 72, in other words after a first winding, in the overlapping region 76, the wound tubular roll 72 is automatically moved downward longitudinally of the winding core 82 to the combined closure and cutting device 91 as the paper web 73 is driven in the region of the winding core 72.

The combined closure and cutting device 91 is movable up and down, for instance along the guide rods 108, as indicated by the double arrow I, so that the length of the wound tubular rolls 72 to be produced and thus the length of the packaging units 70 can be selected.

It can be seen from FIG. 9 that the hollow winding core 82 is formed by annular segment 106, for instance three in number, distributed along the circumference; the transport or draw-off rollers 88 are disposed in the region of one of the segments 106. The segments 106 are retained in a radially adjustable manner, making it possible to set or select the diameter of the wound tubular roll 72 to be produced.

I claim:

1. A bulk packaging material formed as chips of cardboard from packaging cardboard by cutting the packaging cardboard both lengthwise and crosswise, each chip having at least one of a coping surface, bent-over portions and peaks and recesses formed on at least one of its outer surfaces such that the bulk volume of the chips is greater than that of the used packaging cardboard.

2. The bulk packaging material is defined in claim 1, wherein each chip is defined by a substantially uniform matrix of opposed peaks and recesses, disposed alternatingly in rows in at least one of its surfaces.

3. The bulk packaging material as defined in claim 1, wherein the bulk volume represents an increase over the uncut packaging cardboard on the order of 20%, and wherein the chips have a size on the order of approximately 40×50 mm.

4. A process for producing bulk packaging material from packaging cardboard, comprising the steps of:
    cutting the packaging cardboard to form chips of cardboard; and
    deforming the packaging cardboard to have at least one of a coping surface, bent-over portions and peaks and recesses formed on at least one of its outer surfaces to increase the bulk volume of the chips.

5. The process as defined in claim 4, wherein the packaging cardboard is first cut into strips, the strips cut crosswise and thereafter the cut strips deformed to form the chips.

6. The process as defined in claim 4, further comprising the step of:
    removing cardboard dust and other shreds of cardboard formed during cutting by section.

7. An apparatus for producing bulk packaging material, comprising:
    a cutting device for cutting packaging cardboard into chips, including at least one lengthwise cutting unit and at least one crosswise cutting unit; and
    a deforming device for deforming the cut packaging cardboard chips to have at least one of the coping surface, bent-over portions and peaks and recesses formed on at least one of its outer surfaces to increase the bulk volume of the chips over that of the uncut packaging material.

8. The apparatus as defined in claim 7, wherein the deforming device includes two oppositely driven shafts, each provided with a plurality of deforming wheels, with the deforming wheels of one shaft being offset with respect to the deforming wheels of the other shaft such that each deforming wheel engages the gap between adjacent deforming wheels on the other shaft.

9. The apparatus as defined in claim 7, wherein the lengthwise and crosswise cutting units are disposed, one below the other, and wherein the deforming device is disposed below the cutting units.

10. The apparatus as defined in claim 7, further comprising:
    a suction unit connected to at least part of the cutting device; and
    a further suction unit connected to the deforming device.

* * * * *